Feb. 23, 1932.   P. VOLK ET AL   1,846,624
COMBINED CHECK AND CUT-OFF VALVE FOR WATER CLOSETS
Filed Dec. 13, 1930

Peter Volk and
Anthony J. Wubben, INVENTORS
BY
Louis Trewood Whitaker
ATTORNEY

Patented Feb. 23, 1932

1,846,624

UNITED STATES PATENT OFFICE

PETER VOLK AND ANTHONY J. WUEBBEN, OF DAYTON, OHIO, ASSIGNORS TO THE PHILIP HAAS COMPANY, INC., OF DAYTON, OHIO, A CORPORATION OF OHIO

COMBINED CHECK AND CUT-OFF VALVE FOR WATER CLOSETS

Application filed December 13, 1930. Serial No. 502,128.

Our invention consists in the novel features herein described, reference being had to the accompanying drawings which illustrate one embodiment of the same, selected by us for purposes of illustration, and the said invention is fully disclosed in the following description and claims.

The object of our invention is to provide a combined check and cut off valve which, in normally adjusted position, will leave the valve free to move with respect to its seat, so as to serve the function of a check valve, while in another adjusted position the valve may be held seated and prevented from movement so as to serve the purpose of a cut off valve when desired. The adjustable part is also provided preferably with a key receiving portion, and the valve casing is provided with shielding means surrounding the key receiving portion to prevent unauthorized operation of the adjustable part.

Our invention also comprises certain novel features of construction and combination of parts hereinafter fully described and particularly pointed out in the claims.

Referring to the accompanying drawings, which illustrate one embodiment of our invention, selected by us for purposes of illustration, Fig. 1 is a vertical sectional view of a combined check and cut off valve, unseated, and in position to act as a check valve.

Referring to the said drawings, 1, represents the valve casing, provided with the usual inlet, 2, outlet, 3, interior chamber, 4, partition, 5, and valve seat, 6. The interior of the valve casing, 1, is provided with a cylindrical guiding sleeve, 7, which is disposed coaxially with respect to the valve seat, 6, and is located in the portion of the casing between the valve seat and the inlet, 2. The guiding sleeve, 7, is provided adjacent to its inner end with a lateral drain or relief aperture, 8, to permit the water to pass into and out from the lower portion of said sleeve, as hereinafter described. The upper portion of the valve casing on the opposite side of the valve seat from the sleeve, 7, is provided with an interiorly threaded aperture, 9, to receive a bonnet, 10, in which is located a vertically movable and rotatable plunger, 11. The bonnet is provided adjacent to its lower end, with an interiorly threaded aperture, 12, and adjacent to its upper end with an interiorly threaded recess, 13, of greater diameter than said threaded aperture, the lower portion of said recess being formed of a web, 14, having a circular aperture therein, to accommodate the cylindrical upper portion of the plunger, 11. The plunger is provided adjacent to its lower end with a threaded portion, 15, engaging the interiorly threaded aperture, 12, in the bonnet, so that by rotating the plunger, it will be moved longitudinally. The recess, 13, is intended to accommodate suitable packing, indicated at 16, surrounding the cylindrical portion of the plunger above the threaded portion thereof. This packing is compressed by a screw plug, 17, forming the lower portion of a shield member, 18, which has an annular wall, 19, surrounding the upper end of the plunger. The plunger extends through a central bore in the plug portion of the shield member, and is provided at its upper end with a key receiving portion, 20, within the annular wall, 19, of the shield member. This key receiving portion is preferably polygonal in cross section to receive a correspondingly shaped key constructed to pass within the annular wall, 19, of the shield member.

Figure 2:
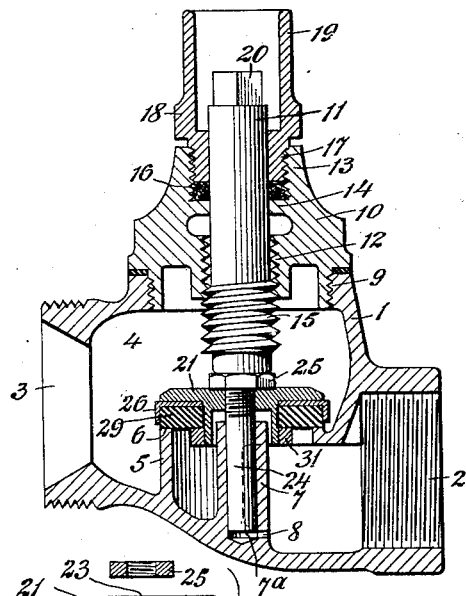
Fig. 2 is a similar sectional view showing the valve held firmly in seated position by means of an adjustable part, and serving as a cut off valve.
Figure 3:
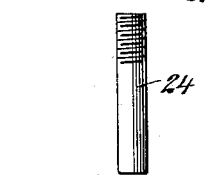
Fig. 3 is a detail sectional view of the parts of the valve unit, in separated relation.

The valve unit illustrated in detail in Fig. 3, comprises a metal valve body, 21, having a downwardly extending exteriorly threaded collar, 22, and an interiorly threaded central aperture, 23, to receive the threaded end of a guiding pin or stem, 24, which is screwed into the aperture 23, and locked by a set nut, 25. The interior diameter of the collar, 22, is such that it will easily pass over the upper end of the sleeve, 7, thus permitting the sleeve to extend up to within, and even slightly beyond the plane of the valve seat, and thus afford a more efficient guiding of the valve, especially when elevated a considerable distance above its seat. 26 represents a washer having a central aperture, 27, to fit over the collar, 22, and provided with an exterior depending flange, 28, to receive and confine against lateral expansion, a valve washer, 29, adapted to fit within the flange, 28, and having a central aperture, 30, of a diameter sufficient to pass over the collar, 22. A nut, 31, engages the collar, 22, and clamps the valve washer, and the washer, 26, between it and the valve body, 21, as clearly shown in Fig. 2. The aperture, 9, in the upper portion of the valve casing is of sufficient size to permit the removal of the valve therethrough, and it will be obvious that the parts of the valve unit may be separated and reassembled for the purpose of renewing the valve washer, 29, which may be of rubber, fibre or other suitable material. The pin or stem, 24, is of such size as to fit easily within the central aperture, 7a, and both the said aperture and the said stem are preferably cylindrical, as indicated in the drawings, so that the valve unit is free to rotate with respect to the seat.

Figure 1:
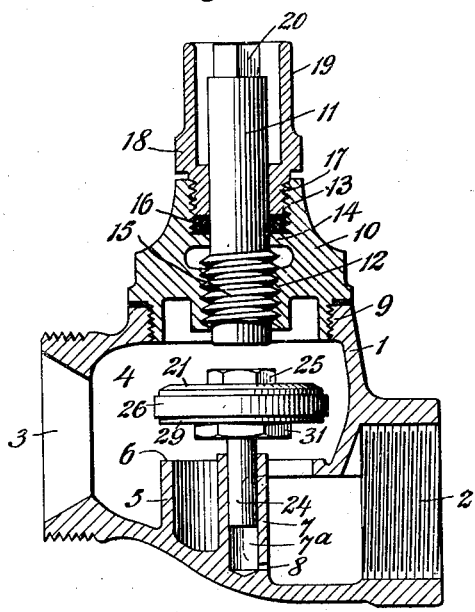

Assuming that the valve casing is connected in a pipe line for supplying liquid under pressure, and the plunger, 11, adjusted to such a position as will permit the valve to rise and fall, the pressure fluid entering the valve casing through the inlet, 2, will elevate the valve to open position, and as the valve stem, 24, rises in the sleeve, 7, the liquid will flow through the aperture, 8, and fill the interior, 7a, of the sleeve below the stem. The valve will move upwardly from its seat until arrested by the lower end of the plunger, 11, and the extent of opening of the valve can be adjusted by rotating the plunger, 11, so as to cause it to move inwardly a greater or less distance toward the valve. In Fig. 1 we have shown the valve in an unseated position, but not in its fully raised position, for greater clearness, but it will be understood that when acted on by pressure of the liquid, the valve will be forced upwardly until it contacts with the lower end of the plunger, 11, in whatever adjusted position the latter may occupy. The valve is obviously held open at all times when liquid is flowing through the valve casing, and when the flow of liquid is stopped on the outer side of the valve casing, so that pressure of the liquid exists within the valve casing, pressure on opposite faces of the valve will be equal, and the weight of the valve will cause it to seat and expel the liquid within the sleeve, 7, which passes therefrom through the drain or relief aperture, 8.

In case it is desired to use the valve as a cut off to prevent any flow of liquid through the valve casing, the plunger, 11, is rotated by its key, so as to move it downwardly carrying the valve with it until the valve is held firmly seated. In such case the liquid within the sleeve, 7a, will be forced out through the drain or relief passage, 8, as the valve unit is forced to its seat.

It will therefore be seen that our improved valve mechanism functions as a cut off valve for closing off all flow through the valve casing and for regulating the amount of opening of the valve in case a throttling action is desired, and further that in any open position of the valve, it is free to seat instantly and perform the functions of a check valve on the reduction of pressure on the inlet side of the valve, thus preventing the possibility of liquid passing through the valve casing from the outlet, 3, to the inlet, 2.

Figure 4:
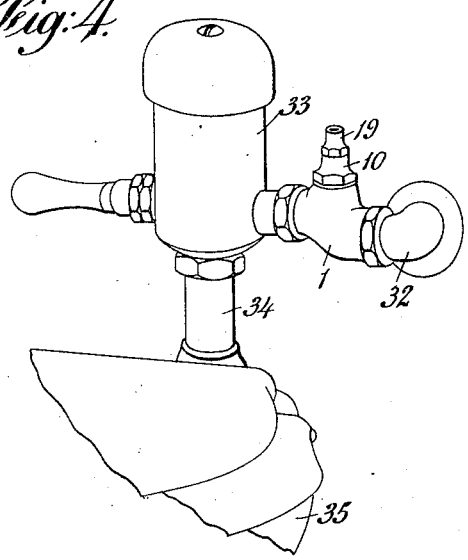
Fig. 4 is a perspective view showing our improved valve inserted in the water supply pipe connected with an ordinary flushing valve for water closets.

In Fig. 4 we have illustrated our improved mechanism installed in the inlet water pipe, 32, connected with the house service water pipe, and leading to a flush valve, 33, of any usual or preferred construction, operatively connected by a flushing pipe, 34, with closet bowl, 35. When so installed, it will be seen that the valve mechanism may be adjusted to supply the water in the desired manner to the flushing valve, for flushing purposes, and will remain normally open for that purpose. Should, however, the closet bowl become choked so as to prevent its emptying, and let the pressure in the house pipe be suddenly reduced, as by the opening of a faucet while the water pressure was cut off, the reduction of pressure in the service pipe would cause the valve to instantly seat and prevent the possibility of contaminating water from the bowl passing outwardly into the service pipe by siphonic action, or otherwise.

It will also be seen that the valve mechanism can be closed, as indicated in Fig. 2, at any time when it is desired to examine or make repairs to the flushing valve. The provision of the shield member, 18, and key receiving portion of the plunger located within the shield member prevents the unauthorized or accidental tampering with the valve.

What we claim and desire to secure by Letters Patent is:

1. A combined check and cut off valve, comprising a casing provided with a valve seat, and an annular guiding sleeve fixed to the casing, coaxially with said seat, a vertically movable valve for engaging said seat, comprising a metal body provided with a central aperture and a depending exteriorly threaded collar of greater diameter than said guiding sleeve, a valve stem secured in said central aperture in position to engage said sleeve, an annular valve washer for engaging said collar, and a nut for said collar for clamping the valve washer and the valve body together, said casing being provided on the side of the valve seat opposite said guiding sleeve with an adjustable plunger normally out of contact with said valve, and means for projecting said plunger into said casing and into contact with said valve to hold it seated.

2. A combined check and cut off valve, comprising a casing provided with a valve seat, and an annular guiding sleeve fixed to the casing, coaxially with said seat, a vertically movable valve for engaging said seat, comprising a metal body provided with a central aperture and a depending exteriorly threaded collar of greater diameter than said guiding sleeve, a valve stem secured in said central aperture in position to engage said sleeve, a metallic washer having a central aperture to engage said collar, and an exterior retaining flange, a valve washer having a central aperture to engage said collar and having its outer edge portion engaging said flange, and a nut on said collar for clamping said valve parts together, said casing having a threaded aperture coaxial with said seat and located on the side of said seat opposite to said sleeve, and a rotary and longitudinally movable plunger having a threaded portion to engage said aperture and capable of being moved into contact with the face of said valve opposite to said stem to hold the valve seated.

In testimony whereof we affix our signatures.

PETER VOLK.
ANTHONY J. WUEBBEN.